US006842150B2

United States Patent
Wei

(10) Patent No.: US 6,842,150 B2
(45) Date of Patent: Jan. 11, 2005

(54) ELECTRONIC DEVICE WITH AUTOMATIC ANTENNA

(75) Inventor: Hsuan-Wu Wei, Taichung (TW)

(73) Assignee: AsusTek Computer Inc., Taipei (TW)

( * ) Notice: Subject to any disclaimer, the term of this patent is extended or adjusted under 35 U.S.C. 154(b) by 0 days.

(21) Appl. No.: 10/385,601

(22) Filed: Mar. 12, 2003

(65) Prior Publication Data

US 2004/0051671 A1 Mar. 18, 2004

(30) Foreign Application Priority Data

Sep. 18, 2002 (TW) ........................................ 91121371 A

(51) Int. Cl.$^7$ ................................................ H04B 1/38
(52) U.S. Cl. ...................................... 343/702; 455/550
(58) Field of Search ........................................ 343/702

(56) References Cited

U.S. PATENT DOCUMENTS 5,166,695 A * 11/1992 Chan et al. ................. 343/702
5,983,119 A * 11/1999 Martin et al. .............. 455/575.7
6,473,046 B1 * 10/2002 Dickie et al. ................ 343/702
6,509,876 B1 * 1/2003 Jones et al. .................. 343/702
6,782,273 B2 * 8/2004 Ono et al. ................ 455/575.4

FOREIGN PATENT DOCUMENTS

TW         388563         4/2000

* cited by examiner

Primary Examiner—James Vannucci
(74) Attorney, Agent, or Firm—Rabin & Berdo, P.C.

(57) ABSTRACT

An electronic device with an automatic antenna. The electronic device includes a body, a cover, an antenna, and a transmission unit. The cover is disposed on the body in a rotatable manner, and the antenna is disposed on the body in a rotatable manner. The transmission unit is connected with the cover and the antenna so that the antenna is rotated relative to the body via the transmission unit when the cover is rotated relative to the body.

11 Claims, 6 Drawing Sheets

ELECTRONIC DEVICE WITH AUTOMATIC ANTENNA

BACKGROUND OF THE INVENTION

1. Field of the Invention

The invention relates to an electronic device; in particular, to an electronic device with an automatic antenna.

2. Description of the Related Art

In normal information technology products, such as mobile phones, personal digital assistants, and smart phones, antennas can be substantially divided into two types.

In one type, the antenna is disposed on the technology product in a manner that it protrudes from the body thereof. Also, the antenna cannot be moved. By such design, the space occupied by the whole product is not integral, and the antenna is easily damaged when the product is stored in a smaller space.

In another type, the antenna is disposed in the product in a moveable manner. However, the antenna can only be directly extracted to obtain better communication effect, or be directly pressed to be stored by hand. Thus, it is not convenient.

SUMMARY OF THE INVENTION

In view of this, the invention provides an electronic device with an automatic antenna.

Another purpose of the invention is to provide an electronic device with an antenna fitting the whole appearance of the electronic device.

Still another purpose of the invention is to provide an electronic device with an antenna that is driven by the electronic device. That is, when a cover of the electronic device is opened, the antenna can rise to obtain better communication effect. Also, when the cover is closed, the antenna can be moved to be adjacent to the electronic device itself so that the electronic device can be conveniently stored.

Accordingly, the invention provides an electronic device with an automatic antenna. The electronic device comprises a body, a cover, an antenna, and a transmission unit. The cover is disposed on the body in a rotatable manner, and the antenna is disposed on the body in a rotatable manner. The transmission unit is connected with the cover and the antenna so that the antenna is rotated relative to the body via the transmission unit when the cover is rotated relative to the body.

In a preferred embodiment, the electronic device further comprises a first rotary shaft and a second rotary shaft. The first rotary shaft is connected with the cover, and is rotated by the cover when the cover is rotated relative to the body. The second rotary shaft is connected with the antenna, and the antenna is rotated relative to the body when the second rotary shaft is rotated.

Furthermore, the transmission unit comprises a first gear and a second gear. The first gear is disposed on the first rotary shaft so as to rotate along with the first rotary shaft. The second gear, disposed on the second rotary shaft, abuts the first gear so that the antenna is rotated by the first gear via the second gear.

Furthermore, both of the first gear and the second gear are bevel gears.

In another preferred embodiment, the first gear is formed with a first toothless portion so that the second gear is not rotated by the first gear when the second gear is abutted by the first toothless portion of the first gear.

In another preferred embodiment, the second gear is formed with a second toothless portion so that the second gear is not rotated by the first gear when the first gear is abutted by the second toothless portion of the second gear.

In another preferred embodiment, the transmission unit comprises a sensor, a controller, and a motor. The sensor is disposed on the body, and senses the position of the cover, and outputs a signal. The controller is coupled to the sensor, and receives the signal from the sensor and outputs a signal. The motor is coupled to the controller, and rotates the antenna based on the signal from the controller.

In another preferred embodiment, the transmission unit is disposed in the body.

In another preferred embodiment, the cover includes a screen.

It is understood that the electronic device may be a mobile phone or a personal digital assistant.

BRIEF DESCRIPTION OF THE DRAWINGS

The invention is hereinafter described in detail with reference to the accompanying drawings in which:

FIG. 2a is a schematic view of a transmission unit in the electronic device in FIG. 1a;

FIG. 2b is a partial enlarged view of FIG. 2a;

FIG. 3b is a schematic view of a variant embodiment of a transmission unit in FIG. 3a;

DETAILED DESCRIPTION OF THE INVENTION

First Embodiment

Figure 1A:
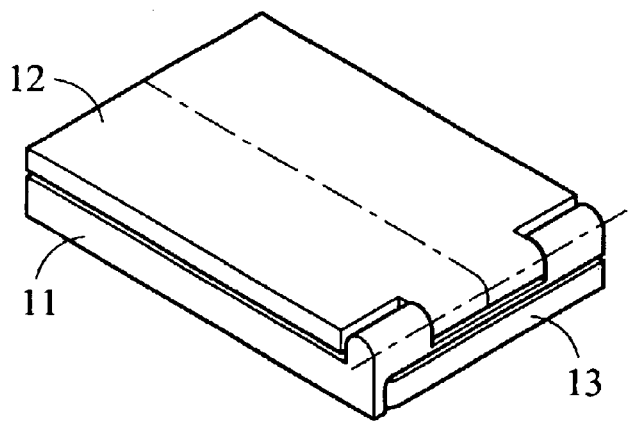
FIG. 1a, FIG. 1b, and FIG. 1c are schematic views of an electronic device as disclosed in a first embodiment of this invention.

Referring to FIG. 1a, FIG. 1b, FIG. 1c, FIG. 2a, and FIG. 2b, an electronic device as disclosed in a first embodiment of this invention is shown. In this embodiment, the electronic device 10 comprises a body 11, a cover 12, an antenna 13, a transmission unit 14, a first rotary shaft 15, and a second rotary shaft 16.

The body 11 is a basic unit of the electronic device 10, and includes a plurality of buttons 111. It is understood that other units (not shown) required by the electronic device 10 are disposed inside the body 11.

The cover 12 is disposed on the body 11 in a rotatable manner, and includes a screen 121 to show related information about the electronic device 10. The cover 12, having the screen 121, can be referred as a display. It is understood that the screen may be disposed on the body.

The antenna 13 is disposed on the body 11 in a rotatable manner to enhance the communication affect of the electronic device 10.

Figure 2A:
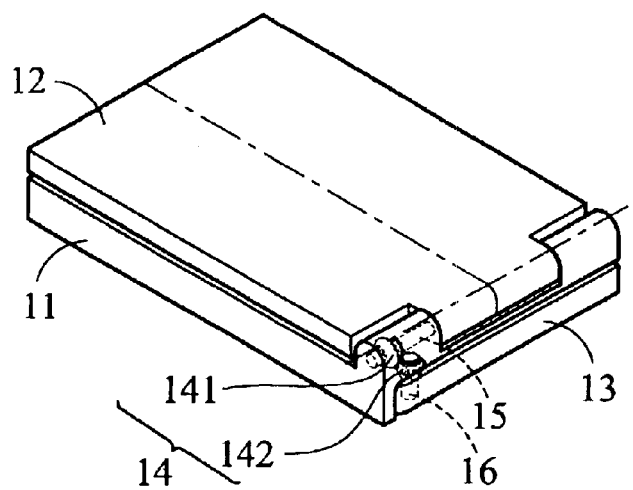
Figure 2B:
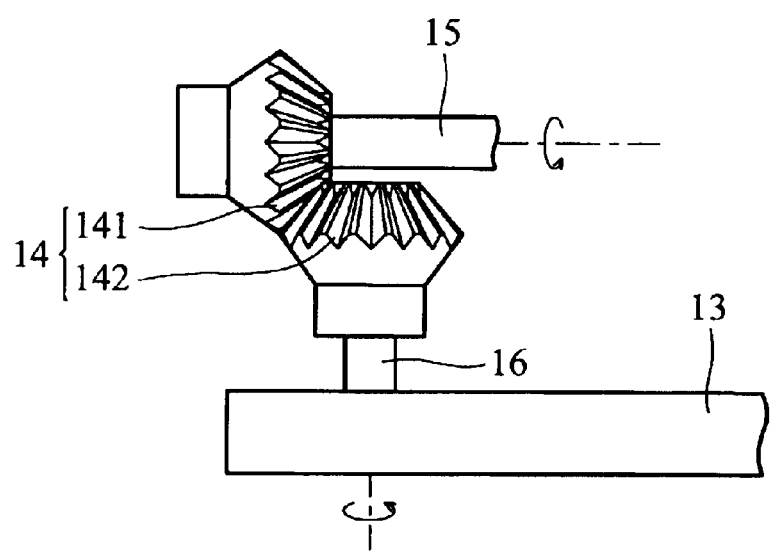

As shown in FIG. 2a and FIG. 2b, the first rotary shaft 15 passes through the body 11 and the cover 12 to connect them. The second rotary shaft 16 passes through the body 11 and the antenna 13 to connect them. The transmission unit 14 comprises a first gear 141 and a second gear 142. The first gear 141 is disposed on the first rotary shaft 15 so as to rotate along with the first rotary shaft 15. The second gear 142 is disposed on the second rotary shaft 16, and abuts the first gear 141 so that the second rotary shaft 16 is rotated by the first gear 141 via the second gear 142.

By such arrangement, the transmission unit 14 is disposed in the body 11, and is connected with the cover 12 via the first rotary shaft 15, and with the antenna 13 via the second rotary shaft 16. Thus, when the cover 12 is rotated relative to the body 11, the first rotary shaft 15 is rotated in the body 11 following the rotation of the cover 12. Then, the second rotary shaft 16 is rotated by the first rotary shaft 15 via the first gear 141 and the second gear 142 so that the antenna 13 is rotated by the second rotary shaft 16.

It is understood that the first gear 141 and the second gear 142 may be bevel gears.

Figure 1B:
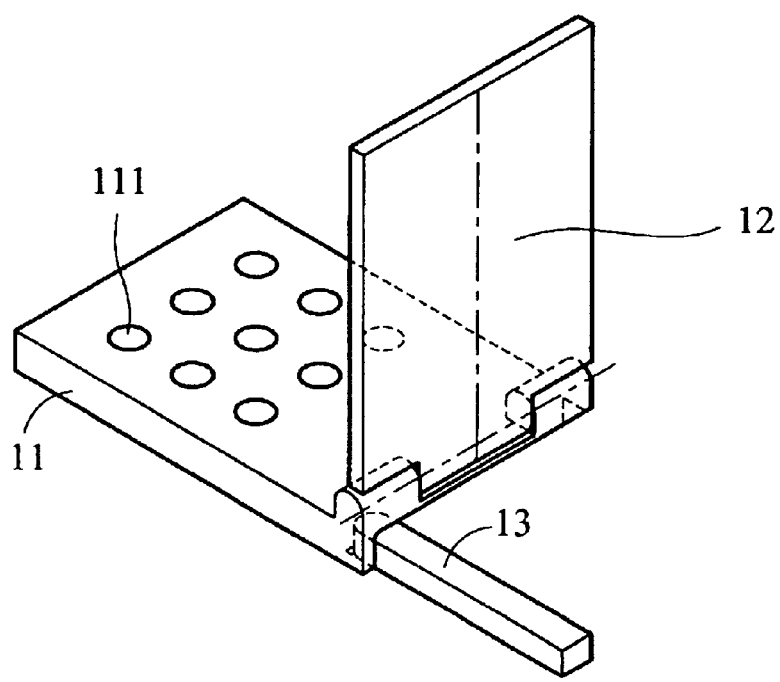
Figure 1C:
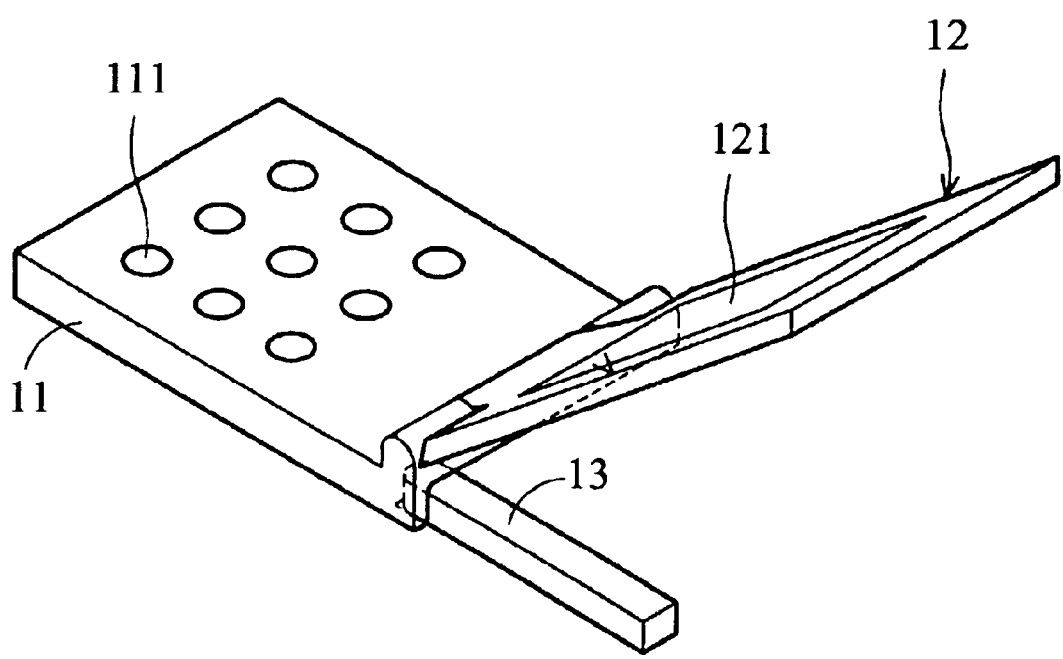

When the cover 12 is rotated to a position as shown in FIG. 1b from a position as shown in FIG. 1a, the cover 12 is rotated about ninety degrees relative to the body 11. At the same time, the antenna 13 is also rotates about ninety degrees relative to the body 11. However, when the cover 12 is rotated to a position as shown in FIG. 1c from a position as shown in FIG. 1b, the cover 12 is rotated more than ninety degrees relative to the body 11. At the same time, the antenna 13 is maintained at a position as shown in FIG. 1b due to the limitation of the structure of the electronic device 10.

As stated above, since the antenna of this embodiment can be automatically moved following the rotation of the cover, its operation is more convenient.

Furthermore, the antenna can be completely received beside the body and the cover, so the whole appearance of the electronic device can be more appealing and integral.

Second Embodiment

Referring to FIG. 3a, FIG. 4a, FIG. 4b, and FIG. 4c, an electronic device as disclosed in a second embodiment of this invention is shown. In this embodiment, the electronic device 10a comprises a body 11, a cover 12, an antenna 13, a transmission unit 14a, a first rotary shaft 15, and a second rotary shaft 16. It is noted that in this embodiment, the body 11, the cover 12, the antenna 13, the first rotary shaft 15, and the second rotary shaft 16 are substantially the same as those of the first embodiment; therefore, their description is omitted.

Figure 3A:
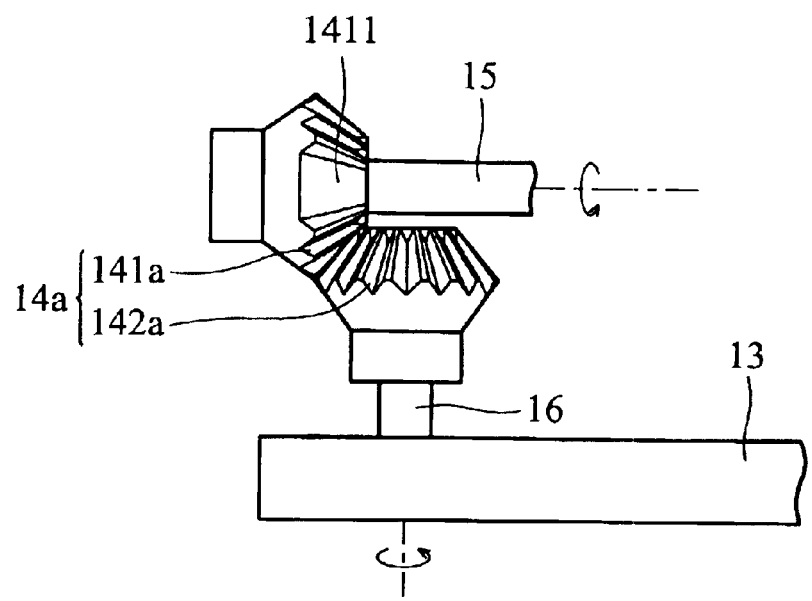
FIG. 3a is a schematic view of a transmission unit as disclosed in a second embodiment of this invention.

In this embodiment, the transmission unit 14a is similar to the transmission unit 14 of the first embodiment, and comprises a first gear 141a and a second gear 142a. The difference between the first embodiment and the second embodiment is that the first gear 141a is formed with a first toothless portion 1411 as shown in FIG. 3a. Thus, when the second gear 142a is abutted by the first toothless portion 1411 of the first gear 141a, the second gear 142a is not rotated by the first gear 141a.

Figure 4A:
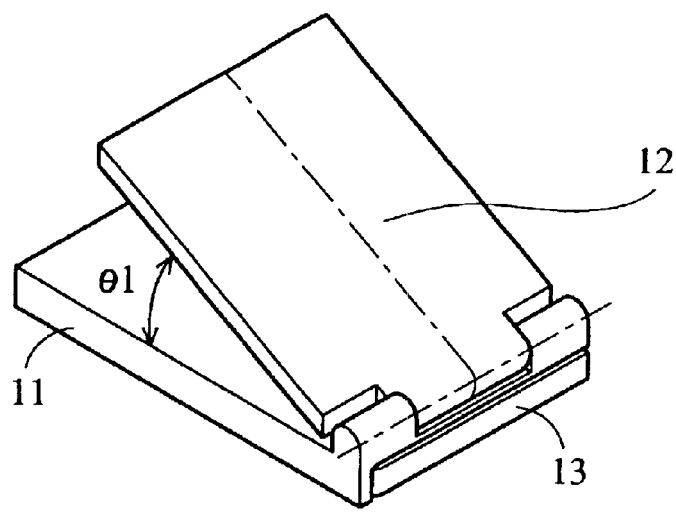
FIG. 4a, FIG. 4b, and FIG. 4c are schematic views of an electronic device as disclosed in a second embodiment of this invention.
Figure 4B:
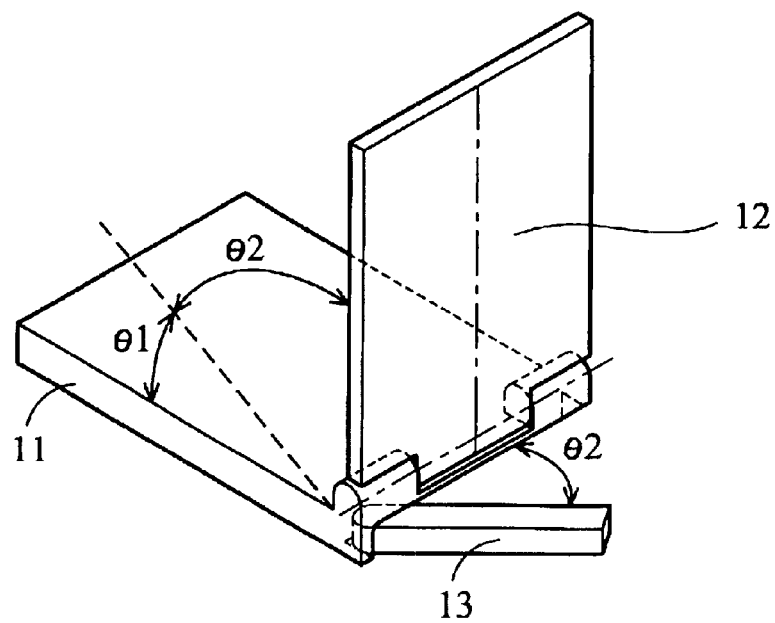
Figure 4C:
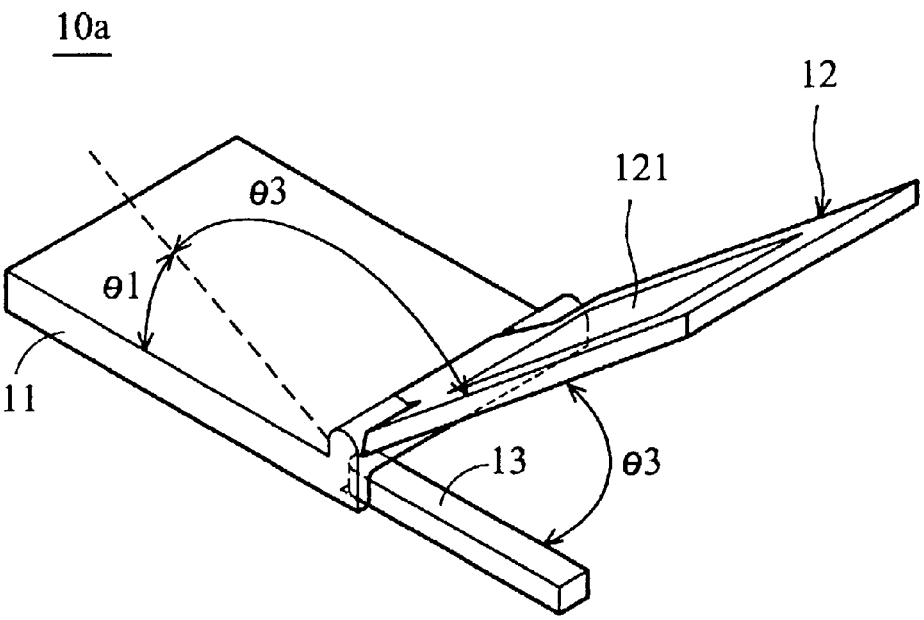

By the first toothless portion 1411 of the first gear 141a, when the cover 12 is rotated to a position as shown in FIG. 1a from a position in which the cover 12 is adjacent to the body 11, the antenna 13 is maintained at an original position. Specifically, since the second gear 142 is set to abut the first toothless portion 1411 of the first gear 141a when the cover 12 is rotated about an angle θ1 relative to the body 11 as shown in FIG. 4a, the antenna 13 is not driven by the second gear 142 to remain in the original position. Furthermore, when the cover 12 is rotated to a position as shown in FIG. 4b from a position as shown in FIG. 4a to rotate about an angle (θ1+θ2) relative to the body 11, the antenna 13 is rotated about an angle θ2 relative to the body 11. Furthermore, when the cover 12 is rotated to a position as shown in FIG. 4c from a position as shown in FIG. 4b to rotate about an angle (θ1+θ3) relative to the body 11, the antenna 13 is rotated about an angle θ3 relative to the body 11.

As stated above, by the first toothless portion 1411 of the first gear 141a, the antenna 13 starts to rotate after the cover 12 is rotated at a predetermined angle. Thus, the relationship between the antenna 13 and the cover 12 can be more variable.

Figure 3B:
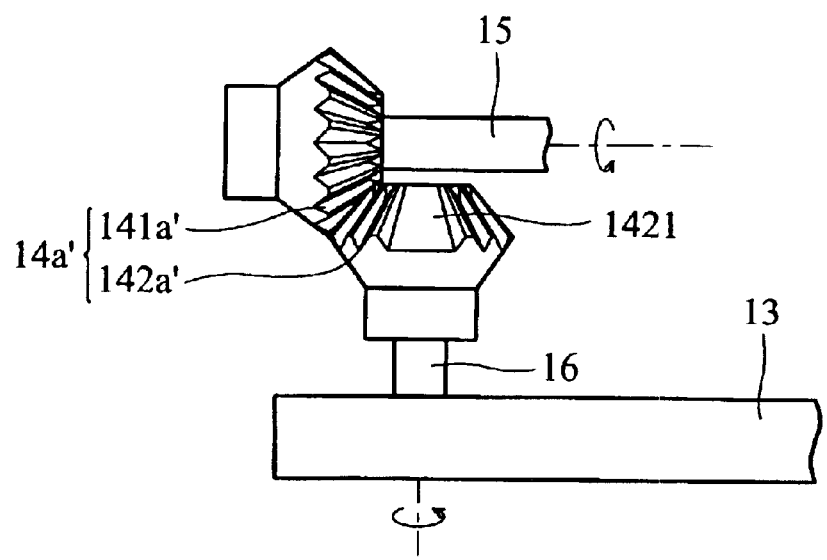

It is noted that the toothless portion is not limited to be formed on the first gear. For example, as shown in FIG. 3b, the second gear 142a' of the transmission unit 14a' may be formed with a second toothless portion 1421. Thus, when the first gear 141a' is abutted by the second toothless portion 1421 of the second gear 142a', the second gear 142a' is not rotated by the first gear 141a'. As a result, the transmission unit 14a can obtain the same effect as the transmission unit 14a.

Third Embodiment

Figure 5:
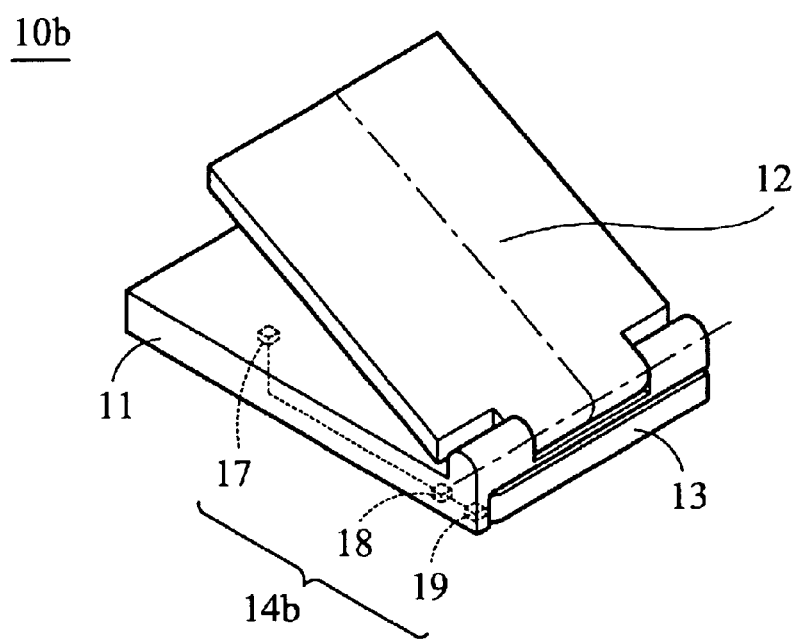
FIG. 5 is a schematic view of an electronic device as disclosed in a third embodiment of this invention.

Referring to FIG. 5, an electronic device as disclosed in a third embodiment of this invention is shown. In this embodiment, the electronic device 10b comprises a body 11, a cover 12, an antenna 13, and a transmission unit 14b. It is noted that in this embodiment, the body 11, the cover 12, and the antenna 13 are substantially the same as those of the first embodiment; therefore, their description is omitted.

The difference between the first embodiment and the third embodiment is that the transmission unit 14b of this embodiment comprises a sensor 17, a controller 18, and a motor 19.

The sensor 17 is disposed on the body 11, and senses the position of the cover 12 and outputs a signal. Specifically, a predetermined value of a critical angle of the cover 12 can be preset by the designer. When the cover 12 is rotated to exceed such predetermined value, the sensor 17 outputs a signal to the controller 18.

The controller 18 is coupled to the sensor 17, and receives the signal from the sensor 17 and outputs a signal, and controls the motor 19 based on the signal of the sensor 17. The motor 19 is coupled to the controller 18, and rotates the antenna 13 based on the signal from the controller 18.

As stated above, after the cover 12 is rotated more than the predetermined angle relative to the body 11, the sensor 17 detects such condition so as to actuate the motor 19 to rotate the antenna 13 via the controller 18.

Thus, in this embodiment, the antenna 13 can be rotated following the rotation of the cover 12.

While the invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives which have been discussed above, and all equivalents thereto.

What is claimed is:

1. An electronic device, comprising:
   a body;
   a cover disposed on the body in a rotatable manner;
   an antenna disposed on the body in a rotatable manner; and a transmission unit connected with the cover and the antenna so that the antenna is rotated relative to the body via the transmission unit when the cover is rotated relative to the body, the transmission unit comprising a sensor disposed on the body to sense a position of the cover and output a signal.

2. The electronic device as claimed in claim 1, wherein the transmission unit further comprises:

a controller, coupled to the sensor, for receiving the signal from the sensor and outputting a further signal; and a motor, coupled to the controller, for rotating the antenna based on the further signal from the controller.

3. The electronic device as claimed in claim 1, wherein the transmission unit is disposed in the body.

4. The electronic device as claimed in claim 1, wherein the cover includes a screen.

5. The electronic device as claimed in claim 1, wherein the electronic device is a mobile phone.

6. The electronic device as claimed in claim 1, wherein the electronic device is a personal digital assistant.

7. An electronic device comprising:

a body;

a display disposed on the body in a rotatable manner;

an antenna disposed on the body in a rotatable manner; and a transmission unit connected with the display and the antenna so that the antenna is rotated relative to the body via the transmission unit when the display is rotated relative to the body, the transmission unit comprising a sensor disposed on the body to sense a position of the display and output a signal.

8. The electronic device as claimed in claim 7, wherein the transmission unit further comprises:

a controller, coupled to the sensor, for receiving the signal from the sensor and outputting a further signal; and a motor, coupled to the controller, for rotating the antenna based on the further signal from the controller.

9. The electronic device as claimed in claim 7, wherein the transmission unit is disposed in the body.

10. The electronic device as claimed in claim 7, wherein the electronic device is a mobile phone.

11. The electronic device as claimed in claim 7, wherein the electronic device is a personal digital assistant.

* * * * *